United States Patent
Kaiser

(10) Patent No.: US 7,014,213 B1
(45) Date of Patent: Mar. 21, 2006

(54) CONDUIT SYSTEM

(76) Inventor: Christof Kaiser, Lindenstrasse 37a, 78576, Emmingen (DE)

( * ) Notice: Subject to any disclaimer, the term of this patent is extended or adjusted under 35 U.S.C. 154(b) by 249 days.

(21) Appl. No.: 10/110,823

(22) PCT Filed: Sep. 29, 2000

(86) PCT No.: PCT/EP00/09538

§ 371 (c)(1),
(2), (4) Date: Aug. 5, 2002

(87) PCT Pub. No.: WO01/29472

PCT Pub. Date: Apr. 26, 2001

(30) Foreign Application Priority Data

Oct. 16, 1999 (DE) ................................ 199 49 926

(51) Int. Cl.
*F16L 39/00* (2006.01)
(52) U.S. Cl. ................ 285/125.1; 285/130.1; 285/325; 403/255; 403/292

(58) Field of Classification Search .. 285/124.1–124.5, 285/125.1, 126.1, 130.1, 128.1, 325, 292.1; 403/255, 293, 292, 294, 253
See application file for complete search history.

(56) References Cited

U.S. PATENT DOCUMENTS

| | | | | |
|---|---|---|---|---|
| 2,759,360 A | * | 8/1956 | Budnick | 285/125.1 |
| 4,917,535 A | * | 4/1990 | Prassas | 285/125.1 |
| 5,746,535 A | * | 5/1998 | Kohler | 403/258 |
| 5,769,460 A | * | 6/1998 | Imai | 285/18 |
| 5,806,897 A | * | 9/1998 | Nagai et al. | 285/125.1 |
| 5,938,245 A | * | 8/1999 | Guzzoni | 285/305 |
| 6,059,322 A | * | 5/2000 | Nagai et al. | 285/125.1 |
| 6,179,349 B1 | * | 1/2001 | Guzzoni | 285/125.1 |
| 6,193,281 B1 | * | 2/2001 | Nagai et al. | 285/125.1 |

* cited by examiner

*Primary Examiner*—David Bochna
(74) *Attorney, Agent, or Firm*—Bachman & LaPointe, P.C.

(57) ABSTRACT

A conduit system for supplying, conducting and distributing fluids, especially air, comprising profiles, which have a longitudinal channel for the fluid and, in at least one outer wall, at least one recess for receiving a fastening element for a connecting element. The fastening element passes through the connecting element and comprises a clamping piece which is inserted into a recess and fixed in the recess by turning.

15 Claims, 8 Drawing Sheets

CONDUIT SYSTEM

BACKGROUND OF THE INVENTION

The invention relates to a conduit system for supplying, conducting and distributing fluids, especially air, comprising profiles which have a longitudinal channel for the fluid and, in at least one outer wall, at least one recess for receiving a fastening element for a connecting element.

Conduit systems of this type are known in many and various forms and designs. They are used, for example, to conduct liquids, but primarily to conduct air and here in particular to conduct compressed air to desired removal points.

G 91 02 781.0 U1, for example, discloses a hollow rail or rod generally used to conduct or channel and distribute fluids, which consists of extruded profile material made of aluminum and has a central longitudinal bore and flute-like or channel-like grooves extending laterally in the longitudinal direction and open to the outside. With the aid of connecting elements, this rail or rod can be detachably connected, in modular fashion, to other rods or rails formed in the same way and running coaxially with it or at an angle to it. Said connecting elements comprise tubular connecting pieces and connecting plates running between the mutually facing ends and able to be connected to the latter and sealing the latter off, even under pressure. Furthermore, outlet holes serving for the removal of the fluid are provided along the rails or rods, in each case being covered and sealed by a removable closure and outlet plate, which has at least one continuous threaded hole which serves to connect a distribution or consumer line for the fluid.

In order to fix the connecting plate to the profile, insert pieces are provided on two screws in each case, which are pushed into the grooves from the front and are fixed at a desired point by tightening the screws. This has the disadvantage that the connecting plates or the like have to be introduced and positioned arduously or, often, have to be shifted along the profile from a far removed point which, for example in the case of overhead work, entails a great deal of trouble.

It is an object of the present invention to provide a system of the aforementioned type with which the production and, above all, the assembly of the connecting elements is made significantly easier.

SUMMARY OF THE INVENTION

The foregoing object is achieved by providing a fastening element which passes through a connecting element and has a clamping piece which can be inserted into a recess and fixed in the recess by turning. This means that the connecting element is put in place and fixed directly at the point at which it is also to be fixed to the profile. Arduous insertion or complicated shifting and positioning of the connecting element over a considerable distance is avoided. Furthermore, the connecting element can be fixed in a substantially more specific manner.

In a preferred exemplary embodiment, the recess in the profile is an undercut groove. As a result, the recess, for example, does not specifically have to be centered to a specific point, to which the connecting element is to be fixed, instead it is possible to fix the connecting element at any desired point on the profile and, if it is not situated correctly, to loosen it again and to shift it.

The clamping piece is preferably a small plate shaped like a parallelogram. This small plate has the advantage that, during rotation in the undercut groove, for example, it strikes the groove walls and therefore cannot be rotated further. The width of the small plate is of course limited to the width of the groove or is less than the latter, specifically in order that this small plate can be inserted into the groove without difficulty.

The fastening element preferably comprises the clamping piece just mentioned and a bolt, which passes through a hole in the connecting element. The bolt in turn engages into a threaded hole in the clamping piece and can be turned in this threaded hole. The bolt head has a recess, preferably to accommodate an insert bit, but another shape of the recess is also possible, for example to accommodate a cross-head screwdriver.

Thought is primarily given to supporting the bolt head against the connecting element via a helical spring. This has the advantage that the clamping piece rests on the underside of the connecting element when at rest. For the purpose of insertion into the groove mentioned above, the clamping piece is inserted into the groove, pressure is then exerted on the bolt via the tool, so that said bolt presses the clamping piece into the groove counter to the back-pressure from the helical spring. The bolt is then rotated with the appropriate tool or with the insert bit, the bolt also carrying the clamping piece with it during the first rotation, until said clamping piece strikes the inner walls of the groove with its parallelogram faces. Further rotation of the clamping piece is therefore prevented, but the bolt continues to rotate with the aid of the tool in the threaded hole in the clamping piece and tightens the clamping piece. The latter then presses from the inside against the undercut flanks of the groove, which fixes the connecting element to the profile.

In order that the clamping piece is already precentered to be received in the groove, outside the position of use it is intended to be received at least partly in a channel or to strike on one edge on the underside of the connecting element. Primarily when two clamping pieces are arranged in a line, precentering is carried out by this channel or by this impact edge, so that correcting the position of the clamping piece before inserting it into the groove does not have to be carried out by means of the tool.

In one exemplary embodiment of the invention, the connecting element is an approximately rectangular basic element which, in two mutually opposite corner regions, preferably in all four corner regions, has a fastening element described above comprising clamping piece and bolt with helical spring. The base element is placed on the profile, so that in each case two clamping pieces move into a groove in the profile in line.

In order to accelerate the assembly still further and to facilitate it, in a further exemplary embodiment thought is given to the connecting element having on one side two fastening elements comprising clamping piece, bolt and helical spring, while the other side is occupied by a pivoting strip. This pivoting strip forms a hinge channel, which can be placed onto one edge of the recess in the profile, that is to say the groove. The edge engages in the hinge channel, so that, so to speak, a hinge is formed between the edge and the pivoting strip. This dispenses with tightening two bolts. On the opposite side of the pivoting strip there are two fastening elements, described above.

For simplicity, the pivoting strip itself can likewise be fixed to the connecting element by fastening elements, in particular by bolts, but after being fixed it no longer has any mobility, like the clamping pieces described above.

In order that the pivoting strip is also centered, a stop edge, against which the pivoting strip is supported, can be formed into the underside of the connecting element.

A connecting element of this type is used, for example, when a connection is to be produced between an opening toward the longitudinal channel and a tapping point for the fluid. In this case, the connecting element itself has a hole which ensures a passage to the opening.

However, the connecting element can also be used in many other ways. For example, it can be used to fix a channel connector. This channel connector is generally a sleeve, which is inserted into the longitudinal channel of the profile so as to be sealed off by an O ring. On the other hand, the channel connector, likewise sealed off by an O ring, can be inserted into a further longitudinal channel or else have a screw connection. It is important here that the channel connector is held in its inserted position and does not slip out, for example under an internal pressure built up in the longitudinal channel. For the purpose of holding the channel connector, the connecting element has a clamp strip, which engages over the profile and engages in an annular groove in the channel connector.

Furthermore, there are connecting elements which are merely intended to connect two profiles to each other. Here, it is possible to provide a pair of clamping pieces of the fastening elements in each case on a plate, opposite pivoting strips, one pivoting strip with a pair of fastening elements being inserted into the grooves of the one profile and the other pivoting strip with the other pair of clamping pieces being inserted into the grooves of the other profile.

The connecting element according to the invention can also be used to produce nodes, T-like and L-like connections. In this case, it is a bent-over plate, but which has a pivoting strip at most on one leg, while the pivoting strip on the other leg is replaced by a pair of fastening elements with clamping pieces.

Also considered as a connecting element is, for example, a wall angle, by means of which a profile run can be fixed to a wall or the like. An appropriate loadbearing leg on this wall angle is preferably to be penetrated by a fastening element described above which has the parallelogram-like clamping piece. In order to fix the profile, this clamping piece is inserted into an appropriately undercut groove and fixed by rotating the bolt.

In order that a predefined position or a predefined course of the profile can be taken into account, there should be a plurality of recesses in the loadbearing leg, so that the fastening element passes through the loadbearing leg at different points. For example, the obvious thing here is a diagonal slot or a slot parallel to the side. Furthermore, it is possible to provide a hole as a transition to a slot, the hole having a diameter which is larger than the diameter of the bolt head. In this way, a fastening element can even be inserted into the slot subsequently, without having to take it apart.

These are only some examples of the way in which the connecting element can be used for a modular construction of the conduit system. Depending on the application, many other possibilities are conceivable.

In the present conduit system according to the invention, a new node point can also be used, but separate protection is requested for this. This node point has a housing which has a plurality of connections, so that depending on the desired configuration, the profiles can be connected to the node point. If a connection of a profile is desired, then it is sufficient to screw a channel connector described above into the corresponding connecting hole, to push the profile onto said channel connector and to fit the appropriate connecting element. Those connections which are not needed should be closed by means of appropriate blind plugs. A node point of this type can be applied and used extremely flexibly.

BRIEF DESCRIPTION OF THE DRAWINGS

Further advantages, features and details of the invention emerge from the following description of preferred exemplary embodiments and using the drawings wherein.

DETAILED DESCRIPTION

Figure 1:
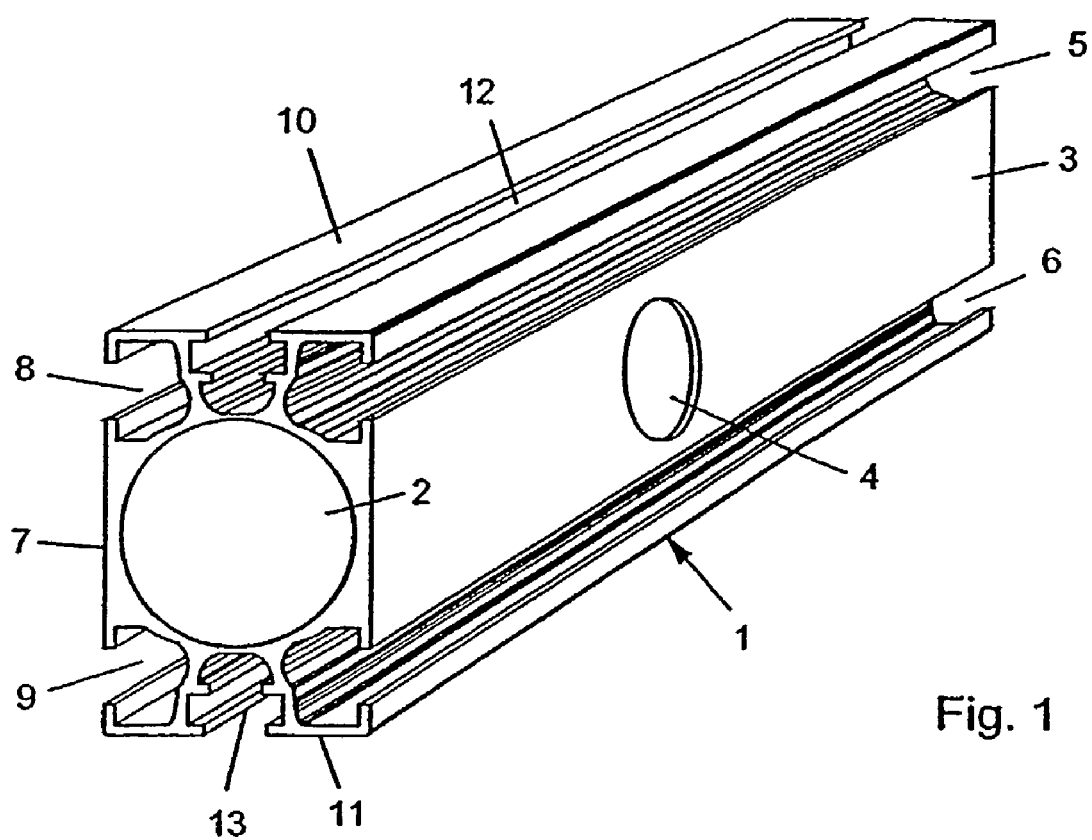
FIG. 1 shows a perspective view of a profile for forming a conduit system according to the invention.

A conduit system according to the invention for supplying, conducting and distributing fluids, in particular air, is to be composed in a modular fashion from individual profiles, as far as possible of the same design. The exemplary embodiment shown in FIG. 1 of a profile 1 has a longitudinal channel 2, in which the fluid is carried. In an outer wall 3 of the profile 1 there is an opening 4, through which fluid can be removed by means of an appropriate connecting element 14.

Furthermore, it can be seen that, in the outer wall 3, two undercut grooves 5 and 6 running parallel to each other are integrally molded, which serve to fix a connecting element 14 described in the following figures.

In this exemplary embodiment of a profile 1, it can be seen that an outer wall 7 lying opposite the outer wall 3 is also provided with respectively two further undercut grooves 8 and 9, while an upper side 10 and a lower side 11 in each case only have one groove 12 and 13. Of course, the upper side 10 and underside 11 can also be provided with two undercut grooves running parallel to each other in each case, so that all the sides of the profile are of identical design. By this means, transpositions during assembly are avoided.

Figure 2:
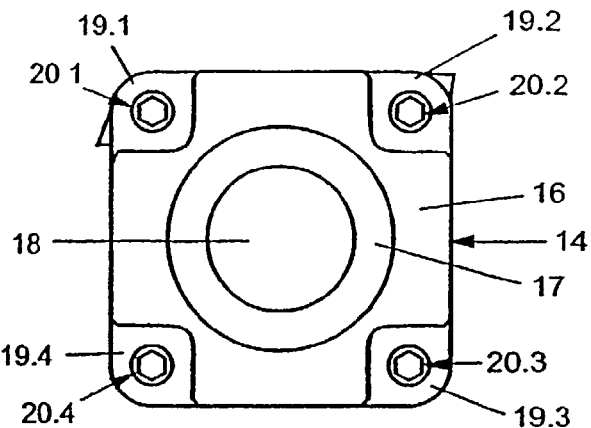
FIG. 2 shows a plan view of a connecting element according to the invention.
Figure 3:
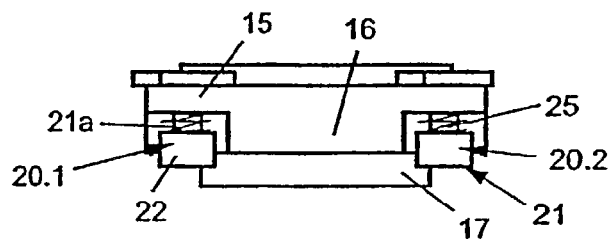
FIG. 3 shows a plan view of the connecting element according to FIG. 2, tilted through 90°.

A connecting element 14 according to the invention, which is intended to form a connection between the profile 1 and a removal point, not specifically shown, or itself to form the removal point, according to FIG. 3 has an approximately rectangular baseplate 15, on which four corner regions 19.1 to 19.4 are formed by an elevation 16. Situated on the elevation 16 is a cylindrical section 17, which constitutes a transfer line to a connecting element of a removal device for the fluid. Cylindrical section 17, elevation 16 and baseplate 15 are penetrated by a hole 18 (FIG. 2) which, in the position of use, is aligned with the opening 4 in the profile 1.

Figure 4:
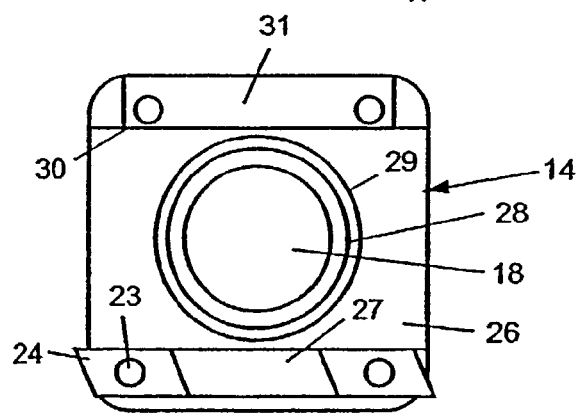
FIG. 4 shows a plan view of the underside of the connecting element according to FIG. 2.

In the corner regions 19.1 to 19.4, four fastening elements 20.1 to 20.4 can be seen. The fastening elements 20.1 and 20.2, according to FIG. 3, each have a bolt 21 comprising a threaded shank 21a and a bolt head 22, said bolt 21 passing through the baseplate 15 and then engaging in a threaded hole 23 shown in FIG. 4 and belonging to a clamping piece 24. This clamping piece 24 is preferably configured like a parallelogram.

With respect to the baseplate 15, the bolt head 22 of the bolt 21 is otherwise supported via a helical spring 25.

Integrally molded into an underside 26 of the connecting element 14 is a channel 27, which serves for the at least partial accommodation and centering of the clamping pieces 24.

In order to seal off the region around the opening 4 in relation to the hole 18 in the position of use after the connecting element 14 has been fixed to the profile 1, an O ring 28 is provided, which is inserted into an annular groove 29 in the underside 26 of the connecting element 14 and surrounds the hole 18.

Figure 5:
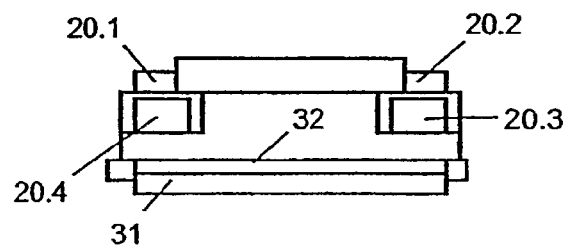
FIG. 5 shows a plan view of the connecting element according to FIG. 4, again tilted through 90°.
Figure 6:
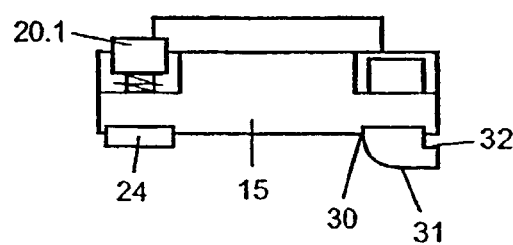
FIG. 6 shows a plan view of the connecting element according to FIG. 5 tilted laterally through 90°.

Furthermore, a stop edge 30 is machined into the underside 26 of the connecting element 14, against which a pivoting strip 31 illustrated in more detail in FIGS. 5 and 6 strikes. The pivoting strip 31 is held by the two fastening elements 20.3 and 20.4, which likewise pass through the baseplate 15 and engage in corresponding threaded holes, not specifically identified, in the pivoting strip 31.

Together with the baseplate 15, the pivoting strip 31 forms a hinge groove 32.

Figure 7:
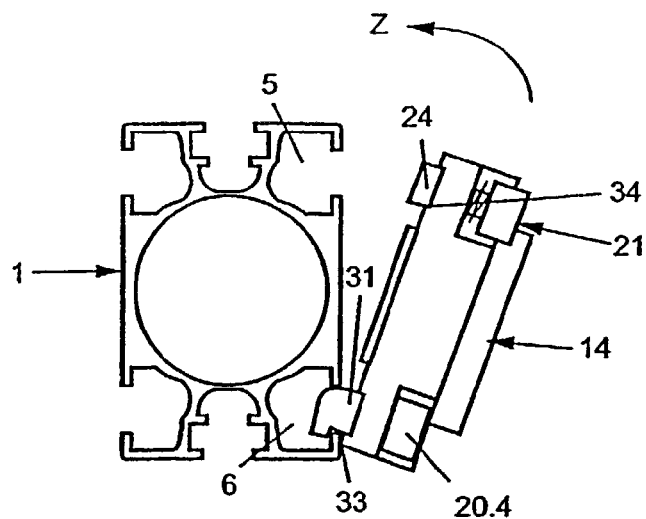
FIG. 7 shows a front view of a profile of a conduit system according to the invention during the insertion of the connecting element according to FIGS. 1 to 5.
Figure 8:
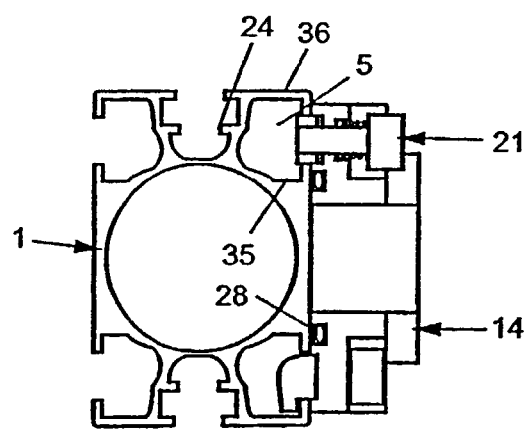
FIGS. 8 and 9 show a front view of the arrangement according to FIG. 7 in further positions of use.

According to FIGS. 7 to 9, the connecting element 14 is connected to the profile 1 in the following way:

The connecting element 14 is placed with the pivoting strip 31 on one edge 33 of the recess 6 and pivoted in the direction toward the profile 1. As soon as the connecting element 14 bears on the profile 1, the clamping piece 24 also engages in the groove 5, the clamping piece 24 being centered via an inner edge 34. This inner edge 34 runs parallel to the slot of the groove 5.

Figure 9:
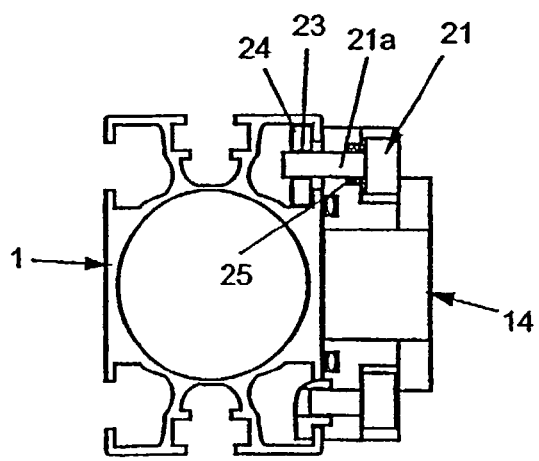
Figure 10:
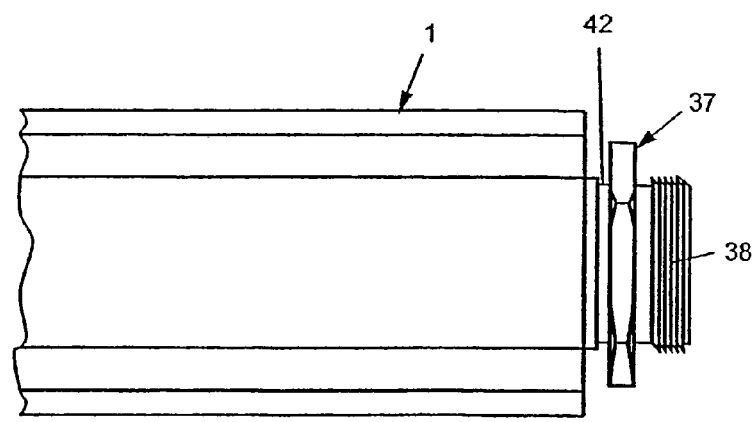
FIG. 10 shows a plan view of a profile of a conduit system according to the invention with a channel connector inserted.
Figures 11, 12, 13:
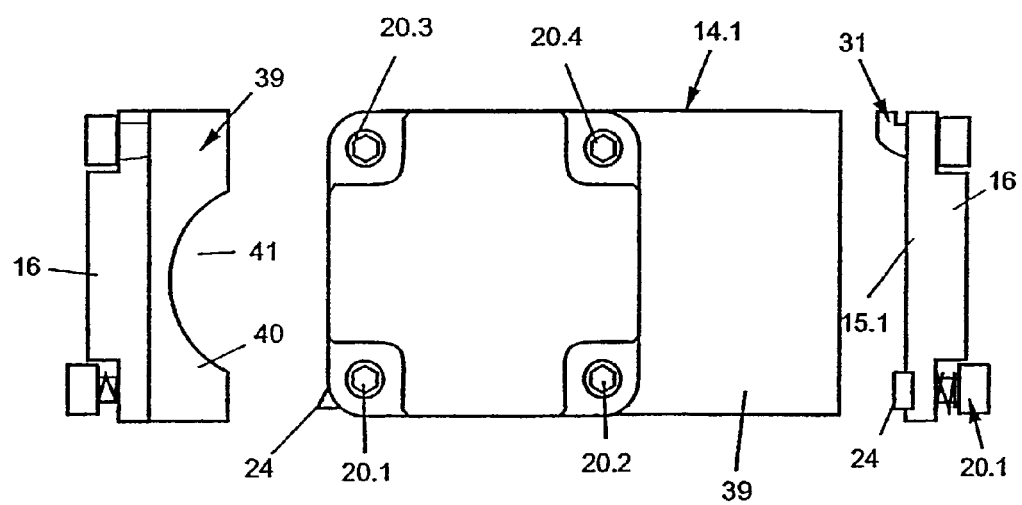
FIG. 11 shows a plan view of a connecting element for connecting the profile according to FIG. 10 to the channel connector.
FIGS. 12 and 13 show front views of the connecting element according to FIG. 11, in each case tilted through 90°.
Figure 14:
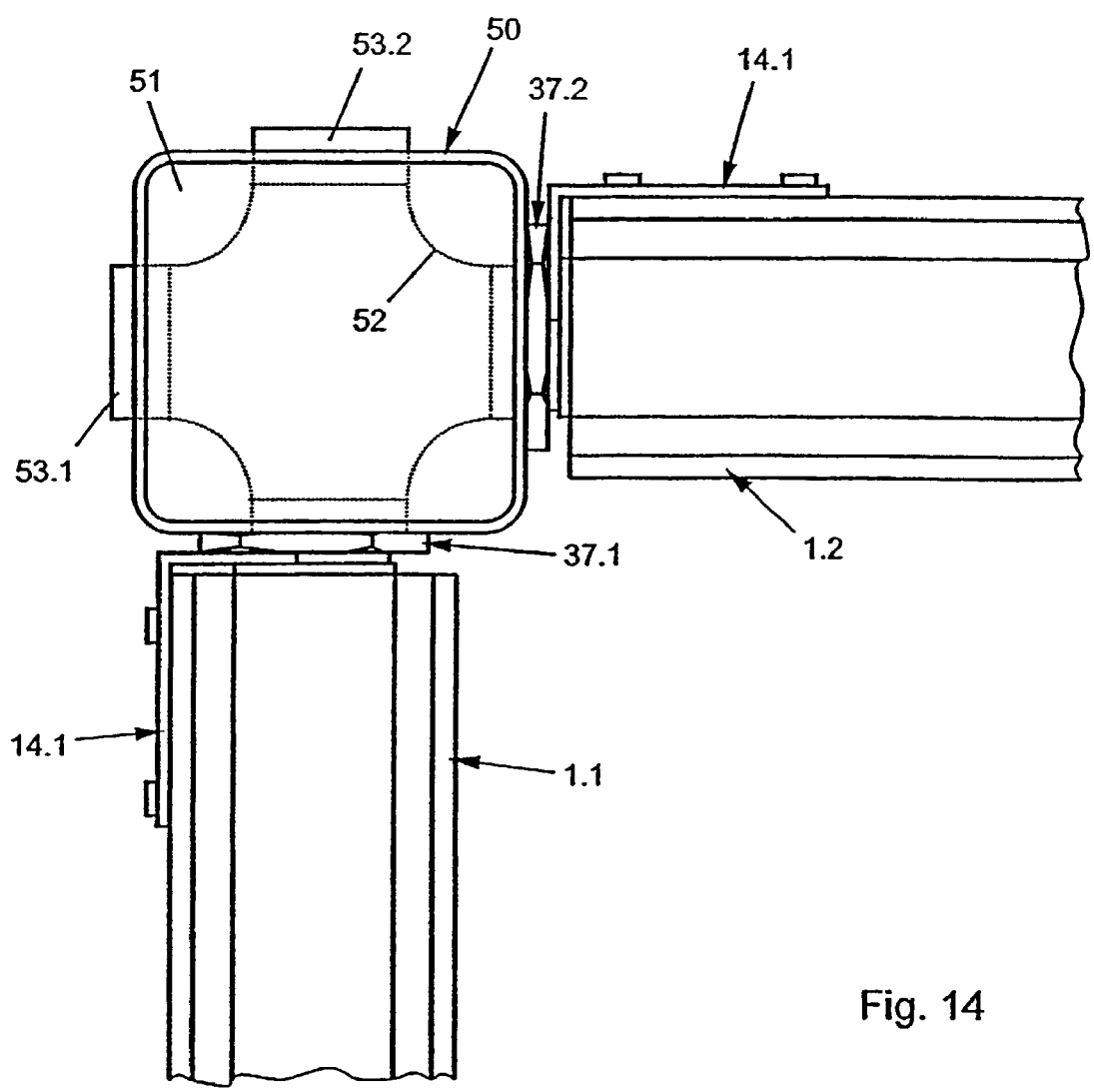
FIG. 14 shows a plan view of a node point according to the invention for connecting two profiles.

Then, according to FIG. 9, pressure is exerted on the bolt 21, so that the latter, together with the clamping piece 24, penetrates into the groove 5 counter to the pressure of the helical spring 25. If the bolt 21 is then rotated, first of all the clamping piece 24 pivots with it until it strikes the groove walls 35 and 36 laterally, the clamping piece 24 preferably being mounted in such a way that two sides of the parallelogram bear on the groove walls 35 and 36. So that the clamping piece 24 corotates with the bolts 21, the threaded hole 23 should have any desired production locking means with respect to the threaded shank 21a or, for example, a covering, an adhesive or the like in order to ensure that the clamping piece 24 is carried along until it bears on the groove walls 35, 36.

If the bolt 21 is now rotated further, then the threaded shank 21a rotates further into the threaded hole 23 in the clamping piece 24, so that the clamping piece 24 is tightened and is pressed from the inside against the groove undercuts. This fixes the fastening elements 14.

In order to loosen the fastening element 14, the bolts 21 are rotated, so that the clamping piece 24 is freed from its clamped position. As soon as the clamping piece 24 is free, it rotates together with the bolt 21, because of the aforementioned locking, and passes into a position in which it can slide back again into the groove opening according to FIG. 8 under spring tension. The clamping piece and, with it, the connecting element 14 therefore becomes free.

In some cases, it is desirable to connect a profile 1 to, for example, a channel connector 37 which, on one side, is plugged into the longitudinal channel 2 in the profile 1, sealed off by an O ring, not specifically illustrated, and on the other side is screwed onto another profile, node element or the like by means of an external thread 38. In order to connect the profile 1 to the channel connector 37, here a connecting element 14.1 is provided which, firstly, has the clamping pieces 24 and, secondly, has the pivoting strip 31. In this case, the connecting element 14.1 has only the baseplate 15 and the elevation 16, it likewise being possible to dispense with the latter.

By contrast, the baseplate 15.1 is extended by a clamping strip 39 which, viewed in cross section, forms an angle profile, a hollow 41 being integrally molded in its front legs 40. In the position of use, this hollow 41 can engage in an annular groove 42 which in turn is integrally molded in the channel connector 37.

The connecting element 14.1 is primarily also suited for the connection of profiles 1.1 or 1.2 to a node point 50. The connection is produced by a connecting element 14.1 and in each case a channel connector 37.1 and 37.2.

In the present exemplary embodiment, the node point 50 has an approximately rectangular housing 51, in the interior of which there is a channel cross 52, illustrated dashed. This channel cross 52 permits the connection of four profiles. Naturally, node points with fewer or more connections also lie within the scope of the invention. In the present exemplary embodiment, only two connections are occupied by channel connectors 37.1 and 37.2, the two other connections are in each case closed by a plug 53.1 and 53.2. Should these connections be used, the respective plug 53.1 or 53.2 can be removed and a channel connector 37 can be screwed in. A node point 50 of this type is extremely flexible.

Figure 15:
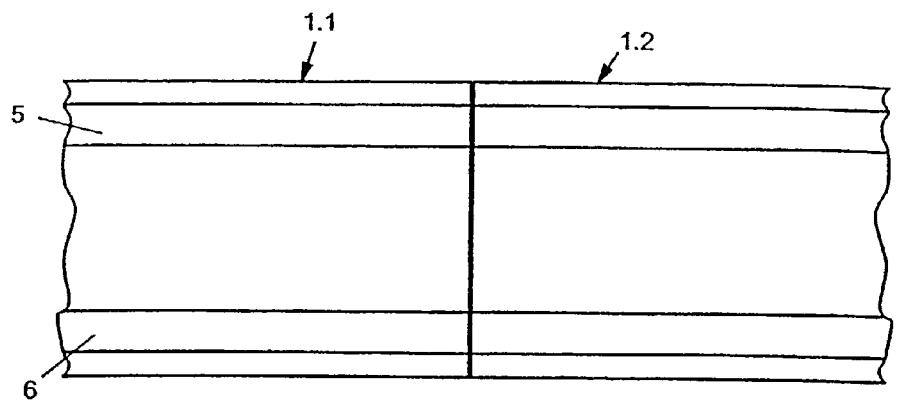
FIG. 15 shows a plan view of two abutting profiles.
Figure 16:
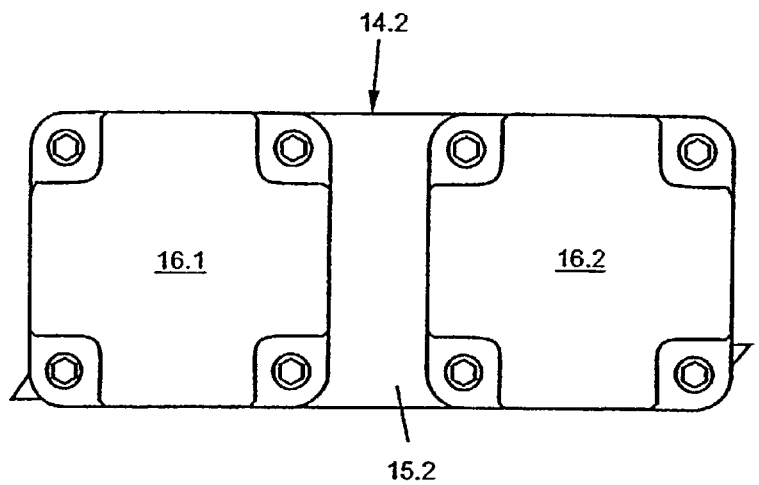
FIG. 16 shows a plan view of a connecting element for connecting the two profiles according to FIG. 14.
Figure 17:
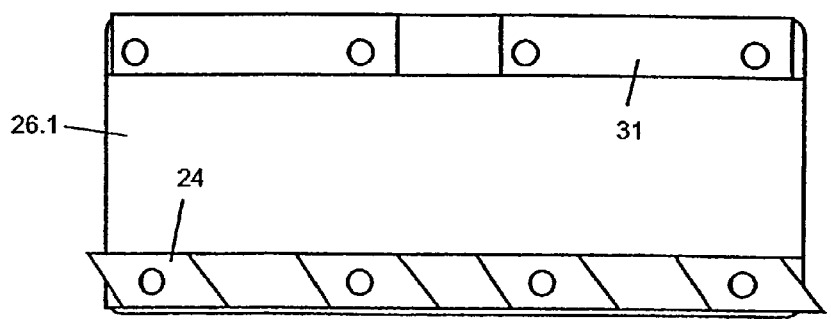
FIG. 17 shows a plan view of the underside of the connecting element according to FIG. 15.

According to FIGS. 15 to 17, there is also the possibility of butt-joining two profiles 1.1 and 1.2 to each other. For this purpose, one connecting element 14.2 has a baseplate 15.2, which is further optionally occupied by two elevations 16.1 and 16.2.

On the underside 26.1 of the baseplate 15.2, two pairs of clamping pieces 24 and two pivoting strips 31 can be seen. In each case a pivoting strip 31 is inserted into the grooves 5 of the profiles 1.1 and 1.2, while in each case a pair of clamping pieces 24 engage in the grooves 6 of the profiles 1.1 and 1.2.

Figure 18:
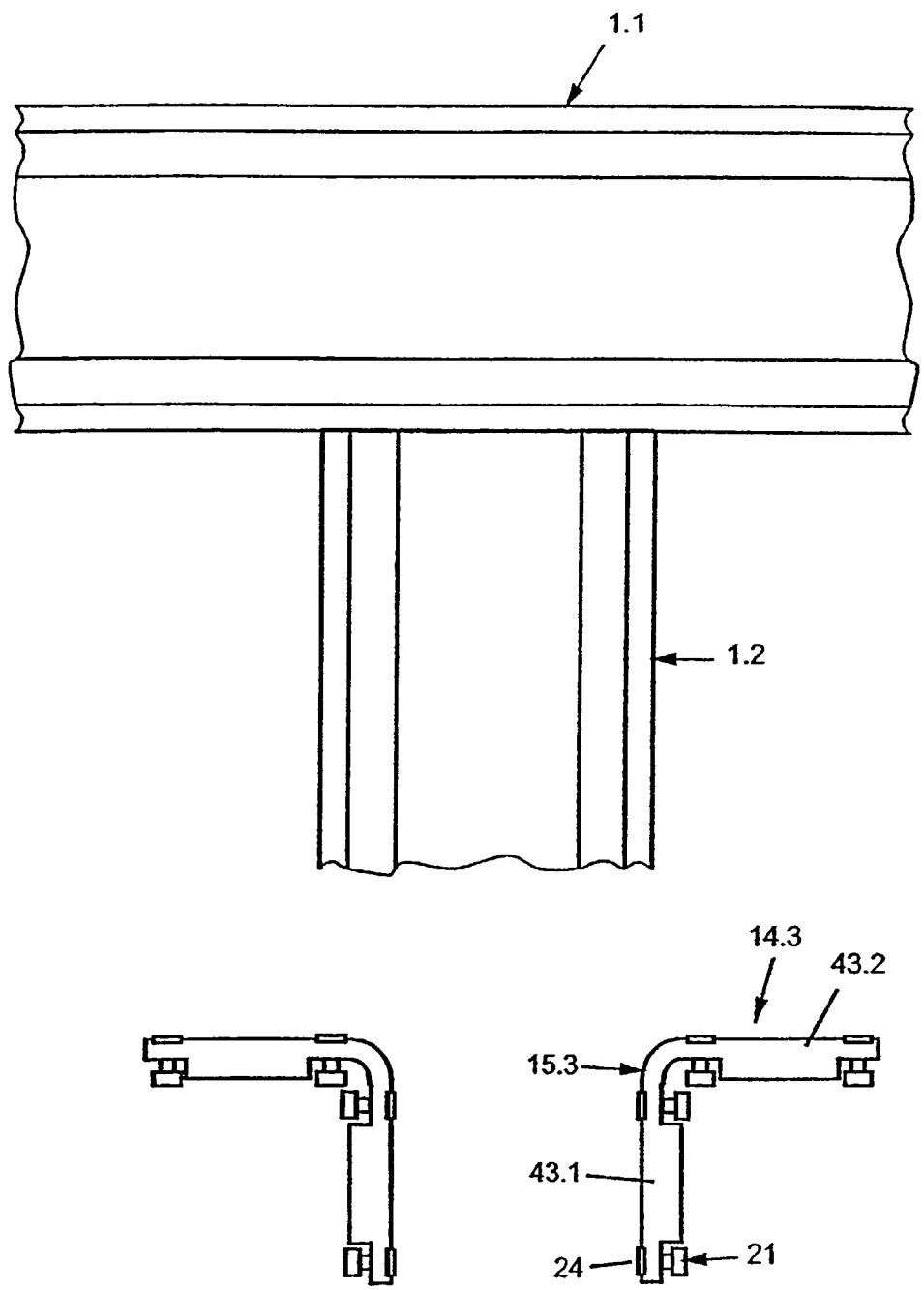
FIG. 18 shows a plan view of two profiles, producing a T-shaped connection, of a conduit system according to the invention with two connecting elements securing this connection outside the position of use.

By means of the system according to the invention, it is also possible for node points, T and L connections to be produced between the profiles, as shown in FIG. 18. In this case, a connecting element 14.3 is substantially formed from a baseplate 15.3 which comprises two bent-over legs 43.1 and 43.2. Each bent-over leg 43.1 and 43.2 in each case has two pairs of mutually opposite clamping pieces 24, so that in this exemplary embodiment the pivoting strips 31 are omitted or there is only one pivoting strip.

For the purpose of assembly, these connecting elements 14.2 are inserted into the corner regions of the profiles 1.1 and 1.2, and the clamping pieces 24 are inserted one after another into the respective undercut groove by means of pressure on the bolts 21, and are rotated and tightened.

Figure 19:
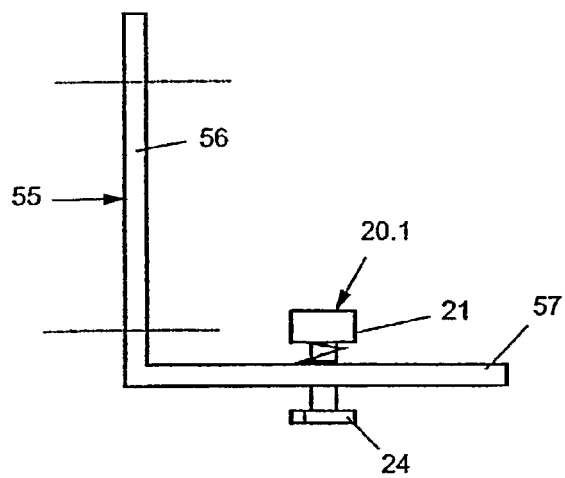
FIG. 19 shows a side view of a wall angle according to the invention for fixing a profile.

To fix the profile 1 according to the invention, for example to a wall, not specifically illustrated, use is made of a wall angle 55, illustrated in FIG. 19. This wall angle 55 has a fastening leg 56 and a loadbearing leg 57. In the loadbearing leg 57 there are preferably various cutouts, into which at least one fastening element 20.1 with clamping piece 24 can be inserted. In the position of use, this clamping piece 24 engages, for example, in the groove 12 or 13 of the profile 1, the profile 1 being fixed by rotating the bolt 21 and therefore the clamping piece 24.

Figure 20:
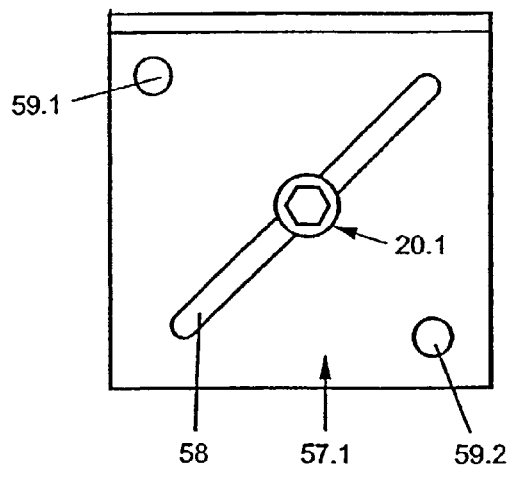
FIG. 20 shows a plan view of the wall angle according to FIG. 19.

According to FIG. 20, a diagonal slot 58 is integrally molded in the loadbearing leg 57.1, while there are further simple holes 59.1 and 59.2 in two corner regions.

Figure 21:
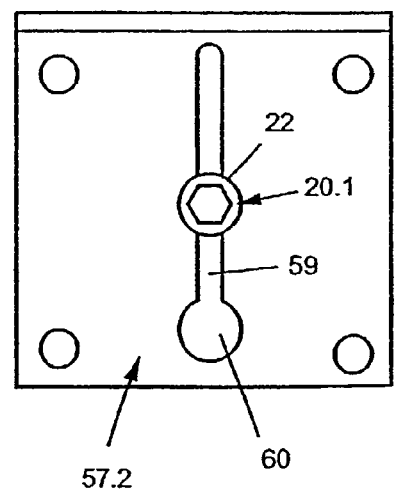
FIG. 21 shows a plan view of a further exemplary embodiment of a wall angle.

In the exemplary embodiment of a loadbearing plate 57.2 according to FIG. 21, a slot 59 parallel to the sides is provided, which is connected to a receiving hole 60, through which the bolt head 22 fits.

The invention claimed is:

1. A conduit system for supplying, conducting and distributing fluids comprising profiles (1, 1.1, 1.2) which have a longitudinal channel (2) for the fluid and, in at least one outer wall (3, 7), at least one recess (5, 6, 8, 9) for receiving a fastening element (20.1, 20.2) for a connecting element (14, 14.1, 14.2, 14.3, 55), the fastening element (20.1, 20.2) passes through the connecting element (14, 14.1, 14.2, 14.3, 55) and has a clamping piece (24) which can be inserted into a recess (5, 6, 8, 9, 12, 13) and can be fixed in the recess by turning the fastening element (20.1, 20.2), the fastening element comprises a bolt (21), which passes through a hole in the connecting element (14, 14.1, 14.2, 14.3, 55), wherein the bolt (21) has a threaded shank (21a) inserted into a threaded hole (23) in the clamping piece (24), wherein a spring is positioned between the bolt head (27) and the connecting element (14, 14.1, 14.2, 14.3, 55).

2. The conduit system as claimed in claim 1, wherein the recess is an undercut groove (5, 6, 8, 9, 12, 13).

3. The conduit system as claimed in claim 1, wherein the clamping piece (24) is a small plate shaped like a parallelogram.

4. The conduit system as claimed in claim 1, wherein the spring (25) is a helical spring (25).

5. The conduit system as claimed in claim 1, wherein the clamping piece (24) is at least partly accommodated into an underside (26, 26.1) of the connecting element.

6. The conduit system as claimed in claim 1, wherein the connecting element has four corner regions (19.1, 19.2), and a fastening element (20.1, 20.2) is provided in each corner region.

7. The conduit system as claimed in claim 1, wherein the connecting element (14, 14.1) has on one side at least two fastening elements (20.1, 20.2), while an other side is occupied by a pivoting strip (31).

8. The conduit system as claimed in claim 7, wherein the pivoting strip (31) forms a hinge channel (32), into which one edge (33) of the recess (5) in the profile (1) is inserted.

9. The conduit system as claimed in claim 7, wherein the pivoting strip (31) is fixed to the connecting element (14, 14.1, 14.2) by means of fastening elements (20.3, 20.4).

10. The conduit system as claimed in claim 7, wherein a stop edge (30) for the pivoting strip (31) is integrally molded into the connecting element (14, 14.1, 14.2).

11. The conduit system as claimed in claim 1, wherein a clamp strip (39) for fixing a channel connector (37) projects from the connecting element (14.1).

12. The conduit system as claimed in claim 11, wherein the channel connector (37) has an annular groove (42), in which the clamp strip (39) partly engages.

13. The conduit system as claimed in claim 1 wherein a plurality of clamping pieces (24) and/or pivoting strips (31) are provided to connect two profiles (1.1, 1.2).

14. The conduit system as claimed in claim 13, wherein a plate (15.3) for producing node points, T or L connections of the profiles (1.1, 1.2) is bent over at a desired angle corresponding to the connection to be produced, and is provided with corresponding fastening elements.

15. The conduit system as claimed in claim 1, wherein the connecting element is a wall angle (55), which has a loadbearing leg (57) with at least one recess (58, 59, 59.1, 59.2, 60) for receiving a fastening element (20.1).

* * * * *